United States Patent Office 3,405,165
Patented Oct. 8, 1968

3,405,165
SULFONIC ACID COMPOUND
Mildred C. Rebstock, Ann Arbor, Mich., assignor to Parke Davis & Company, Detroit, Mich., a corporation of Michigan
No Drawing. Filed Oct. 23, 1965, Ser. No. 504,114
1 Claim. (Cl. 260—472)

ABSTRACT OF THE DISCLOSURE

D-threo-1-p-nitrophenyl-2-dichloroacetamido-3-L-phenylalanyloxypropan-1-ol methanesulfonate. This new substance is rapidly hydrolyzed to chloramphenicol under physiological conditions and thus exhibits the antibacterial activity of chloramphenicol. In addition it has greatly increased water solubility even when compared with substances of quite similar chemical structure.

The present invention relates to a new salt of a chloramphenicol amino acid ester, having increased water solubility and improved pharmaceutical properties. More particularly, the invention relates to a new methanesulfonate salt of D-threo-1-p-nitrophenyl-2-dichloroacetamido-3-L-phenylalanyloxypropan-1-ol, and to methods for its production.

The new methanesulfonate salt of the invention can be represented by the structural formula

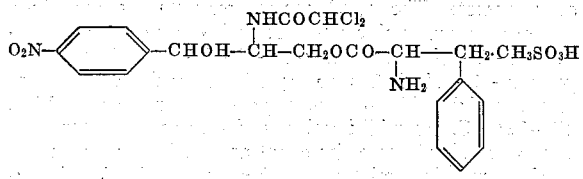

As shown by the foregoing formula, this product is a salt of methanesulfonic acid with a 1-p-nitrophenyl-2-dichloroacetamidopropane-1,3-diol phenylalanine monoester.

The foregoing structural representation, if not otherwise qualified, represents various isomeric forms, including diastereoisomeric as well as optically isomeric forms. However, the product of this invention is a single and particular isomeric form. With respect to the two carbon atoms immediately adjacent to the p-nitrophenyl ring, the compound of the present invention has the relative spatial configuration or arrangement designated "D-threo," corresponding to the same relative spatial configuration or arrangement present in D-threose. With respect to the phenylalanine portion of the molecule, the relative spatial configuration or arrangement is that of L-phenylalanine, the so-called natural configuration.

Amino acid esters of D-threo-1-p-nitrophenyl-2-dichloroacetamidopropane-1,3-diol (chloramphenicol), well-known in the art as chemical derivatives, are rapidly hydrolyzed to give the antibacterial activity of chloramphenicol. In general, acid-addition salts of the amino acid esters have increased water solubility when compared with the corresponding amino acid ester free bases, and thus the acid-addition salts are of value in preparing aqueous solutions for parenteral administration and in other applications where increased water solubility is desired. In the case of D-threo-1-p-nitrophenyl-2-dichloroacetamido-3-L-phenylalanyloxypropan-1-ol (chloramphenicol monoester with L-phenylalanine) the acid-addition salts with low molecular weight acids also show increased water solubility when compared with the amino acid ester free base. However, even the acid-addition salts with low molecular weight, common acids do not exhibit the degree of water solubility desired in aqueous parenteral solutions.

Thus the solubility of D-threo-1-p-nitrophenyl-2-dichloroacetamido-3-L-phenylalanyloxypropan-1-ol free base is less than 0.5 mg./ml. in water, or less than 0.05%. Salts of D-threo-1-p-nitrophenyl-2-dichloroacetamido-3-L-phenylalanyloxypropan-1-ol with common acids such as hydrochloric, sulfuric, citric, and tartaric acids are approximately 20 to 80 times more soluble in water than the free base. However, the average water solubility of most of the salts with common acids is about 2% and thus they would be undesirably dilute if constituted into aqueous solutions for parenteral administration.

It is an object of the present invention to provide a D-threo-1-p-nitrophenyl-2-dichloroacetamido-3-L-phenylalanyloxypropan-1-ol acid-addition salt of greatly increased water solubility.

In the present invention this object is achieved by providing the D-threo-1-p-nitrophenyl-2-dichloroacetamido-3-L-phenylalanyloxypropan-1-ol salt with methanesulfonic acid, otherwise known as D-threo-1-p-nitrophenyl-2-dichloroacetamido-3-L-phenylalanyloxypropan-1-ol methanesulfonate.

In accordance with the invention, D-threo-1-p-nitrophenyl-2-dichloroacetamido-3-L-phenylalanyloxypropan-1-ol methanesulfonate is produced by reacting D-threo-1-p-nitrophenyl-2-dichloroacetamido-3-L-phenylalanyloxypropan-1-ol with methanesulfonic acid. The process is normally carried out by reacting equimolar quantities of the reactants in a suitable solvent medium. While the process can also be carried out using an excess of either D-threo-1-p-nitrophenyl-2-dichloroacetamido-3-L-phenylalanyloxypropan-1-ol or methanesulfonic acid, it is preferable to use the reactants in exactly or almost exactly equimolar amounts as isolation of the reaction product in purified form is facilitated when the reaction mixture does not contain unreacted starting material. Some suitable solvents for the reaction are lower alkanols, such as methanol, optionally containing up to a moderate proportion of water. Other solvents can also be used, especially those which are neutral and polar. The time and temperature of the reaction are not critical as the reaction proceeds almost instantaneously at room temperature or below and there is no need to warm the reaction or carry it out over an extended period of time. The product can be isolated by various methods, for example by concentration and lyophilization of the reaction mixture, or by dilution with a non-polar solvent such as ether.

The D-threo-1-p-nitrophenyl-2-dichloroacetamido-3-L-phenylalanyloxypropan-1-ol used as starting material in the process of the invention can be prepared by any of a variety of methods. The preferred method of preparation is by reacting D-threo-1-p-nitrophenyl-2-dichloroacetamidopropane-1,3-diol (chloramphenicol) with L-phenylalanyl chloride hydrochloride. The identical substance is obtained by substituting DL-threo-1-p-nitrophenyl-2-dichloroacetamidopropane-1,3-diol for the chloramphenicol and subjecting the resulting mixture of diastereoisomers to fractional crystallization. Likewise, the identical substance is also obtained by reacting chloramphenicol with DL-phenylalanyl chloride hydrochloride and subjecting the resulting mixture of diastereoisomers to fractional crystallization.

The D-threo-1-p-nitrophenyl-2-dichloroacetamido-3-L-phenylalanyloxypropan-1-ol methanesulfonate of the invention is useful as a source of D-threo-1-p-nitrophenyl-2-dichloroacetamido-3-L-phenylalanyloxypropan-1-ol having unexpectedly high water solubility. The solubilities of crystalline and amorphous D-threo-1-p-nitrophenyl-2-dichloroacetamido-3-L-phenylalanyloxypropan-1-ol methanesulfonate have been measured at approximately 25° C. in deionized water and have been found to be greater than 10% for the crystalline form and greater than 20% for the amorphous form resulting from lyophilization. Under comparable conditions the solubility of the amorphous hydrochloride is about 3.3%. The aqueous solubility of other salts with sulfonic acids, namely the ethanesulfonate, 1 - propane - sulfonate, 2-propanesulfonate, 1-butanesulfonate, benzenesulfonate, p-toluenesulfonate, carboxymethanesulfonate, ethanedisulfonate, and cyclohexylsulfamate varies from about 0.5% to 2.5%. The aqeuous solubility of other salts such as the citrate, tartrate, succinate, sulfate, phosphate, and aspartate also varies from about 0.5% to 2.5%. The high solubility of the product of the invention is dependent not only on the methanesulfonate portion of the molecule but also on stereochemical relationships present in other portions of the molecule. For example, DL-threo-1-p-nitrophenyl - 2 - dichloroacetamido - 3 - DL - phenylalanyloxypropan-1-ol and D-threo-1-p-nitrophenyl-2-dichloroacetamido - 3-D-phenylalanyloxypropan-1-ol have also been prepared and converted to methanesulfonate salts. However, these methanesulfonate salts, although they are stereoisomers of the product of the invention, are soluble in water only to the extent of less than 2%. The product of the invention forms a relatively stable aqueous solution having an acidic pH value. In neutral or basic medium or under physiological conditions, it is rapidly hydrolyzed to chloramphenicol. Thus, it can be used in the form of an aqueous solution for parenteral administration.

The invention is illustrated by the following example.

EXAMPLE

A solution is prepared by dissolving 705 mg. of D-threo - 1- p - nitrophenyl - 2 - dichloroacetamdio - 3 - L-phenylalanyloxypropan-1-ol in 10 ml. of methanol. This solution is chilled and to it is added 0.95 ml. of a 1.58 N solution of methanesulfonic acid in methanol, containing a total of 144 mg. of methanesulfonic acid. The solvent is removed under reduced pressure to give a residue of D-threo-1-p-nitrophenyl-2-dichloroacetamido-3-L-phenylalanyloxypropan-1-ol methanesulfonate. For purification, the product as obtained above is dissolved in 7 ml. of absolute ethanol and the solution is diluted with 15 ml. of anhydrous ether and refrigerated for 48 hours or until separation of the crystalline product is complete. The product is collected on a filter; M.P. 174–175° C. with a prior transition point at 154–156° C. The melting point behavior depends on the rate of heating. If a sample is placed on a heated melting point block at 140° C., the sample will melt at about 154° C. with resolidification and then remelt at 174–175° C. However, if a sample is placed on a melting point block at room temperature and heated slowly, the transition point at 154° C. is barely noticeable. Crystalline D-threo-1-p-nitrophenyl-2-dichloroacetamido - 3 - L - phenylalanyloxypropan-1-ol methanesulfonate is converted to the amorphous material by dissolving the crystalline form in water and freezing and lyophilizing the solution.

The starting material can be obtained as follows. Phosphorus pentachloride, 8 g., is stirred for 30 minutes with 225 ml. of carbon tetrachloride in order to dissolve as much of the phosphorus pentachloride as possible. L-phenylalanine, 6 g., is then added and the reaction mixture is stirred for 24 hours at 25° C. with protection from atmospheric moisture. The insoluble product which separates is collected on a sintered glass filter, washed with carbon tetrachloride and with petroleum ether, and dried in vacuo at room temperature. This product is L - phenylalanyl chloride hydrochloride. It is suitable for use without further purification and should be used as soon as possible as it undergoes hydrolysis on exposure to atmospheric moisture.

With stirring and with protection from atmospheric moisture, 6 g. of L - phenylalanyl chloride hydrochloride is added to a solution of 7 g. of chloramphenicol in 170 ml. of purified ethyl acetate. The reaction mixture is stirred for 24 hours at 25° C. and the insoluble reaction product is collected by centrifugation and washed 3 times by suspending in petroleum ether and recentrifuging. The last suspension in petroleum ether is filtered and the solid product dried in vacuo at room temperature. This solid product is a white crystalline powder consisting of crude D - threo - 1 - p - nitrophenyl - 2 - dichloroacetamido-3 - L - phenylalanyloxypropan - 1 - ol hydrochloride containing small amounts of chloramphenicol and L - phenylalanine. For purification, 8.57 g. of the crude hydrochloride as obtained above is dissolved in 200 ml. of ice water and the resulting solution (pH 2.3) is extracted twice with 170 ml. portions of cold ether. About 440 mg. of chloramphenicol is removed in the ether extract. The aqueous solution is adjusted to pH 7.8 by the addition of solid sodium bicarbonate (about 3.4 g.) at 0–5° C. and extracted 4 times, each time with an equal volume of ethyl acetate. The ethyl acetate extracts are combined and evaporated to give a residue of D - threo - 1 - p - nitrophenyl - 2 - dichloroacetamido - 3 - L - phenylalanyloxypropan - 1 - ol; following crystallization from 20 ml. of ethylene dichloride, 4.16 g. of product is recovered, M.P. 124–126° C. An additional quantity of the same product can be obtained from the ethyl acetate liquors from the original reaction mixture. If further purification is desired, analytically pure D - threo - 1 - p - nitrophenyl - 2-dichloroacetamido - 3 - L - phenylalanyloxypropan - 1-ol is obtained by dissolving the product in ethyl acetate at room temperature and crystallizing the product by refrigeration; M.P. 131–132° C.; $[\alpha]_D^{25} = +32°$ (4.01% in methanol).

I claim:

1. D - threo - 1 - p - nitrophenyl - 2 - dichloroacetamido - 3 - L - phenylalanyloxypropan - 1 - ol methanesulfonate.

References Cited

UNITED STATES PATENTS 3,190,910   6/1965   Nicolaides _____ 260—472

LORRAINE A. WEINBERGER, *Primary Examiner.*

L. ARNOLD THAXTON, *Assistant Examiner.*